(No Model.) 2 Sheets—Sheet 1.
J. R. VAN DERVEER.
MACHINE FOR COATING CONFECTIONERY.
No. 575,915. Patented Jan. 26, 1897.
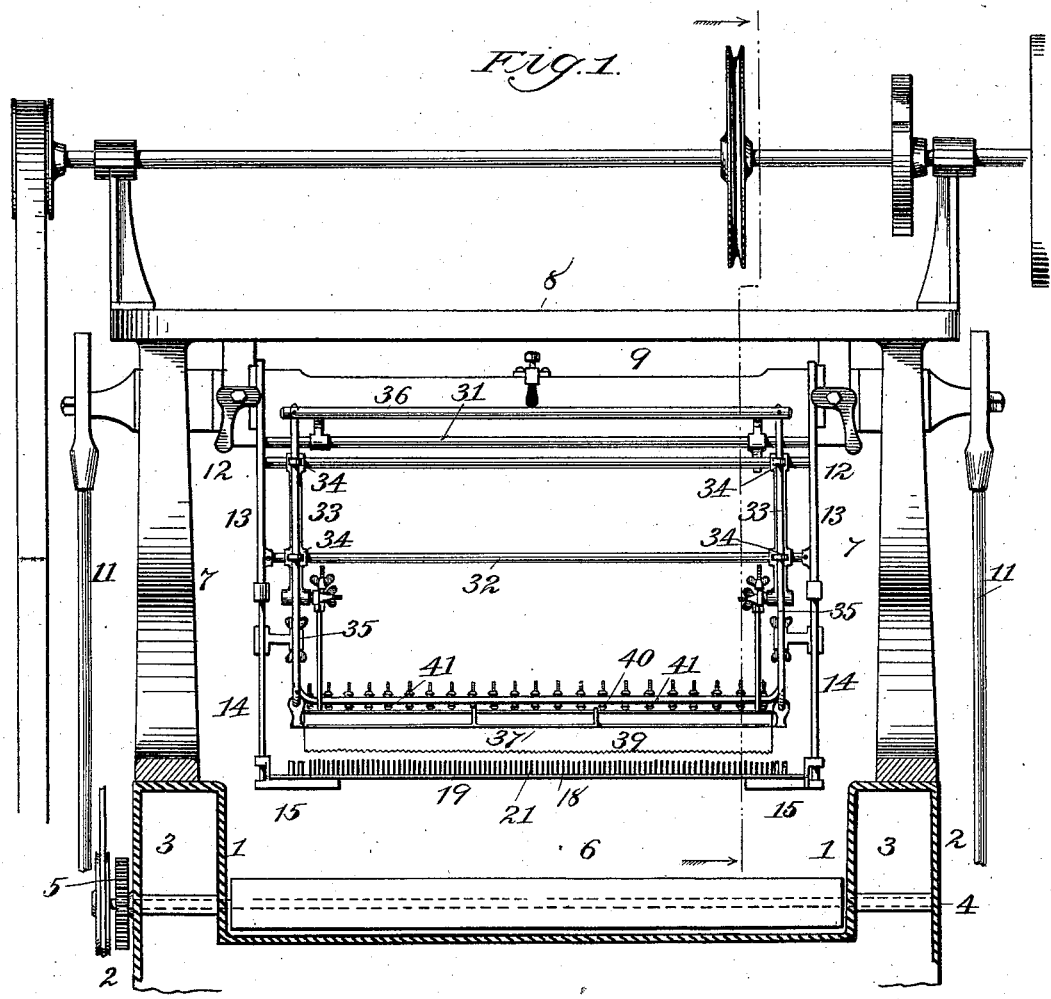
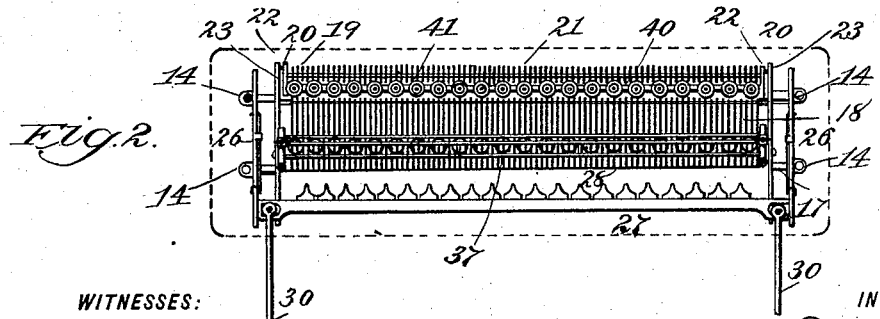
WITNESSES:
INVENTOR
John R. Van Derveer
BY A. M. Pierce
ATTORNEY.

(No Model.) 2 Sheets—Sheet 2.

J. R. VAN DERVEER.
MACHINE FOR COATING CONFECTIONERY.

No. 575,915. Patented Jan. 26, 1897.

WITNESSES:
Edward Rowland.
Geo. J. Stocks.

INVENTOR
John R. Van Derveer
BY A. M. Pierce
ATTORNEY.

UNITED STATES PATENT OFFICE.

JOHN R. VAN DERVEER, OF NEW YORK, N. Y.

MACHINE FOR COATING CONFECTIONERY.

SPECIFICATION forming part of Letters Patent No. 575,915, dated January 26, 1897.

Application filed December 26, 1895. Serial No. 573,266. (No model.)

*To all whom it may concern:*

Be it known that I, JOHN R. VAN DERVEER, a citizen of the United States, residing in the city, county, and State of New York, have invented a new and useful Improvement in Machines for Coating Confectionery, of which the following is a specification.

My invention relates especially to machinery employed for coating confectionery with chocolate and for kindred purposes, and has for its object the provision of means and mechanism whereby each drop or confection will be automatically provided with a raised ridge or marking, such as appears in handmade goods.

To attain the desired end, my invention consists, essentially, in the combination, with drop-dipping mechanism, of means for automatically applying a superposed ridge or marking of the coating material to each drop; and my invention involves certain novel and useful combinations or arrangements of parts and peculiarities of construction and operation, all of which will be hereinafter first fully described, and then pointed out in the claims.

Figure 3:
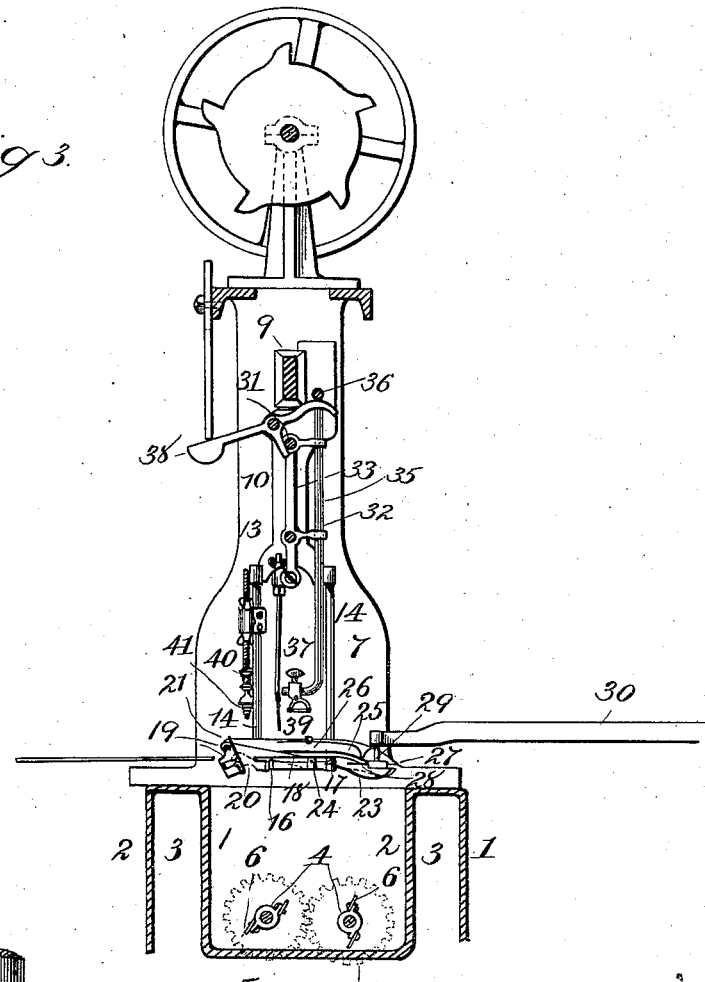
Figure 4:
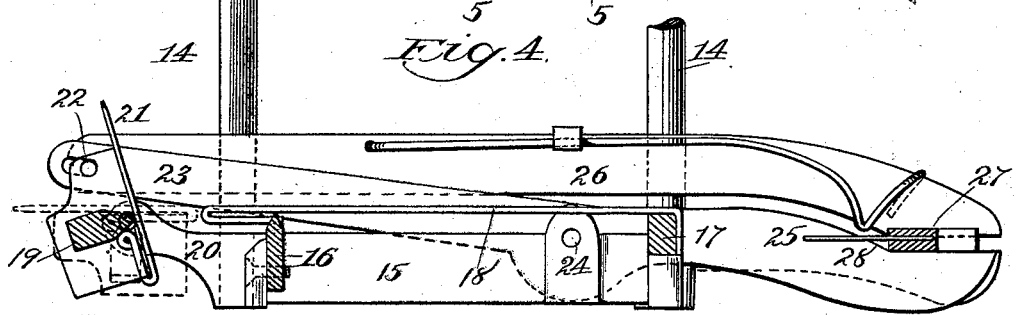

In the accompanying drawings, Figure 1 is a front elevation of my appliance, the coating-tank being shown in vertical section. Fig. 2 is a plan view of the coating mechanism. Fig. 3 is a vertical sectional view at line *x x* of Fig. 1, and Fig. 4 is an enlarged view of the parts shown above the coating-tank in Fig. 3.

Similar numerals of reference, wherever they occur, indicate corresponding parts in all the figures.

1 is the inner wall of the coating-tank, and 2 the outer wall, a hot-water space 3 being left between said walls. Passing through this tank are shafts 4, bearing gear-wheels 5 upon their outer extremities by which rotary motion is imparted to stirrers 6, fixed upon the shafts 4 within the coating-material tank, the object of this arrangement being to keep the coating material thoroughly mixed and at a uniform temperature throughout.

7 are supports extending upward at the sides of the coating-tank, said supports being connected by a cross-piece 8.

9 is a vertically-reciprocatable bar extending between the uprights 7 and arranged to play in slots 10 therein. Reciprocating motion is imparted to this bar 9 and the parts carried by it through the medium of the pitmen 11, connected to suitable operating mechanism.

Connected to the bar 9 and held in place by catch-pieces 12 are vertical pieces 13, carrying rods 14, having plates 15 at bottom, connected together by cross-bars 16 and 17, whereon rests the fixed drop-support 18, composed of wires, rods, or open-work.

19 is a cross-bar pivoted in extensions 20 from the plates 15, said bar bearing the tiltable portion 21 of the drop-support. Pivoted at 22 to this portion 21 are arms 23, which in turn are pivoted to the plates 15 at 24. The arms 23 are curved downward at 25, as particularly shown in Fig. 4.

26 are bars fixed to the rods 14 a short distance above the arms 23, the lower faces of said bars conforming in curvature to the upper faces of the arms 23.

27 is a bar extending between the bars 26 at each side of the dipping mechanism and bearing drop-centering projections 28. The bar 27 rests upon the arms 23 and is perforated at each end for the reception of projections 29 upon the feeding-bars 30, which are connected to a suitable reciprocating device, whereby the drops may be pushed over the dipping frame or support and off of it onto a carrying-belt or other suitable receiver.

31 and 32 are rods connecting the pieces 13 together and bearing vertical bars 33, provided with eyes 34, wherein play vertical rods 35, connected together at the top by a crossbar 36 and at the bottom by a drop-holding device 37. This entire holding mechanism is normally held in the position shown in the drawings by the stop 38, as particularly illustrated in Fig. 3.

39 is a flexible brushing-strip depending from the bars 33.

Fixed to the front rods 14 is a cross-bar 40, bearing vertically-adjustable coating-material carriers and appliers 41, corresponding in number and arrangement to the drops it is desired to apply marking to. I have shown the carriers and appliers 41 as made in the shape of inverted cones, but the shape may be varied at pleasure in accordance with the requirements of the work to be done without departing from the spirit of my invention.

The operation of my device is as follows: The tank being filled with coating material, such, for instance, as chocolate, this material is kept at the desired consistency by hot water within the space 3. The drops to be coated are placed in the feeding device 28, and through the medium of the bars 30 pushed beneath the holding device 37, and then the feeding device returns to its initial position. The dipping mechanism now begins to descend, being drawn downward by the pitmen 11, releasing the stop 38, permitting the holding device to descend upon the drops, holding them against displacement when immersed in the coating material. As the dipping mechanism descends it is disengaged from the bars 30, this operation being fully illustrated in Patent No. 492,205, issued to D. M. Holmes February 21, 1893, and is carried downward until the drops and the carriers 41 are covered, when the return stroke takes place, lifting the dipping device until the parts assume the position shown in Figs. 3 and 4. The drop-holding device is lifted from the drops and the surplus coating material drains from them, and they are slowly moved forward by the action of the bars 30. The surplus coating material is at this time dropping from the carriers 41, dripping back into the tank, between the fixed and tilting portions of the drop-support, thus preventing accumulation and hardening of said material thereon.

As the feeding device moves forward the tilting portion 21 is lowered by the depression of the bars 23, forming a continuous delivering-support from the dipping mechanism, and as the drops pass beneath the carriers 41 a superposed ridge or marking of the coating material is received from them by each drop. By raising and lowering the carriers 41 the width and character of the marking may be changed at pleasure, and by using carriers of different conformation the style of this marking may be infinitely varied.

Having now fully described my invention, what I claim as new therein, and desire to secure by Letters Patent, is—

1. In a machine of the character herein specified, the combination with drop-dipping mechanism, of a device for automatically applying a ridge or marking of the coating material to each drop, after the body has been coated, substantially as shown and described.

2. In a machine of the character herein specified, a vertically-reciprocatable drop-support, a device for automatically moving the drops from said support after dipping, and a device for marking the surface of each drop by a deposit of the coating material, after the body has been coated, the whole combined and arranged to operate substantially as shown and described.

3. In a machine of the character herein specified, the combination with a vertically-reciprocatable drop-dipping support, of a series of coating-material carriers and appliers, located above the drop-support, substantially as shown and described.

4. In a machine of the character herein specified, the combination with a vertically-reciprocatable drop-dipping support, having a fixed horizontal portion, of a tiltable portion at the front of the fixed portion, and a series of coating-material carriers and appliers located above the point of meeting of the said two parts, substantially as shown and described.

5. In a machine of the character herein specified, the combination with a vertically-reciprocatable drop-dipping support, of a series of adjustable coating-material carriers located above said support; means for holding the drops in place upon the support, moving them over and off of the support, and a brushing device located in front of the drop-holder, substantially as shown and described.

6. In a machine of the character herein specified, a series of coating-material carriers and appliers located above the drop-dipping support, and carried by said support, substantially as shown and described.

7. In a machine of the character herein specified, a device for automatically marking the drops by the application of superposed coating material, after the body of the drop has been coated, substantially as shown and described.

JOHN R. VAN DERVEER.

Witnesses:
A. M. PIERCE,
GEO. J. STOCKS.